US012060177B2

(12) United States Patent
Tsuruta et al.

(10) Patent No.: US 12,060,177 B2
(45) Date of Patent: Aug. 13, 2024

(54) VERTICAL BAG-MAKING/FILLING/PACKAGING MACHINE, MANUFACTURING METHOD OF FILM PACKAGING BAG WITH CONTENT, AND FILM PACKAGING BAG WITH CONTENT

(71) Applicant: ORIHIRO Engineering Co., Ltd., Tomioka (JP)

(72) Inventors: Orihiro Tsuruta, Tomioka (JP); Masataka Tsuruta, Tomioka (JP); Akira Yamaguchi, Tomioka (JP)

(73) Assignee: ORIHIRO Engineering Co., Ltd., Tomioka (JP)

( * ) Notice: Subject to any disclaimer, the term of this patent is extended or adjusted under 35 U.S.C. 154(b) by 0 days.

(21) Appl. No.: 18/275,857

(22) PCT Filed: Feb. 4, 2022

(86) PCT No.: PCT/JP2022/004372
§ 371 (c)(1),
(2) Date: Aug. 4, 2023

(87) PCT Pub. No.: WO2022/176645
PCT Pub. Date: Aug. 25, 2022

(65) Prior Publication Data

US 2024/0116659 A1 Apr. 11, 2024

(30) Foreign Application Priority Data

Feb. 18, 2021 (JP) ................................. 2021-023890

(51) Int. Cl.
*B65B 3/02* (2006.01)
*B31B 70/14* (2017.01)
(Continued)

(52) U.S. Cl.
CPC ................ *B65B 3/02* (2013.01); *B31B 70/14* (2017.08); *B31B 70/84* (2017.08); *B65B 3/04* (2013.01);
(Continued)

(58) Field of Classification Search
CPC .... B65B 3/02; B65B 3/04; B65B 7/02; B65B 9/12; B65B 43/10; B65B 51/26;
(Continued)

(56) References Cited

U.S. PATENT DOCUMENTS 5,241,804 A * 9/1993 Tsuruta .................. B65B 9/213 53/526
5,463,851 A * 11/1995 Nagai ............... B29C 66/83221 53/374.8
(Continued)

FOREIGN PATENT DOCUMENTS

DE 1169834 B 5/1964
JP 10-181703 A 7/1998
(Continued)

OTHER PUBLICATIONS

International Search Report dated Apr. 12, 2022, issued in counterpart International Application No. PCT/JP2022/004372, with English Translation. (6 pages).
(Continued)

*Primary Examiner* — Frederick C Nicolas
(74) *Attorney, Agent, or Firm* — WHDA, LLP

(57) ABSTRACT

A vertical bag-making/filling/packaging machine (1) includes: a top folding portion (20) which forms a first fold (F1) by folding a side of a band-shaped film (F) into a Z-shape; a bottom folding portion (30) which forms a second fold (F5) by folding a center of the film (F) into an M-shape; a top seal portion (40) which forms a top gusset (G3) and a spout portion (G7) protruding from the top gusset
(Continued)

(G3) by heat-welding the first fold (F1) and side edges (E1 and E2) of the film (F) so as to make the film (F) into a tube shape; and a bottom-seal portion (50) which forms a bottom gusset (G4) by heat-welding the second fold (F5).

19 Claims, 9 Drawing Sheets

(51) Int. Cl.

| | |
|---|---|
| ***B31B 70/84*** | (2017.01) |
| ***B65B 3/04*** | (2006.01) |
| ***B65B 7/02*** | (2006.01) |
| ***B65B 9/12*** | (2006.01) |
| ***B65B 9/20*** | (2012.01) |
| ***B65B 9/213*** | (2012.01) |
| ***B65B 9/22*** | (2006.01) |
| ***B65B 43/10*** | (2006.01) |
| ***B65B 51/10*** | (2006.01) |
| ***B65B 51/26*** | (2006.01) |
| ***B65B 51/30*** | (2006.01) |
| ***B65B 57/00*** | (2006.01) |
| ***B65B 61/06*** | (2006.01) |
| ***B65B 61/18*** | (2006.01) |
| ***B65B 61/24*** | (2006.01) |
| ***B65D 75/00*** | (2006.01) |
| ***B65D 75/12*** | (2006.01) |
| ***B65D 75/48*** | (2006.01) |
| ***B65D 75/58*** | (2006.01) |

(52) U.S. Cl.

CPC .................. *B65B 7/02* (2013.01); *B65B 9/12* (2013.01); *B65B 9/20* (2013.01); *B65B 9/2028* (2013.01); *B65B 9/2042* (2013.01); *B65B 9/2056* (2013.01); *B65B 9/213* (2013.01); *B65B 9/22* (2013.01); *B65B 43/10* (2013.01); *B65B 51/10* (2013.01); *B65B 51/26* (2013.01); *B65B 51/303* (2013.01); *B65B 57/00* (2013.01); *B65B 61/06* (2013.01); *B65B 61/186* (2013.01); *B65B 61/24* (2013.01); *B65D 75/008* (2013.01); *B65D 75/12* (2013.01); *B65D 75/48* (2013.01); *B65D 75/5883* (2013.01); *B65B 2220/06* (2013.01); *B65B 2220/08* (2013.01); *B65D 2207/00* (2013.01); *B65D 2575/586* (2013.01)

(58) Field of Classification Search

CPC ....... B65B 61/06; B65B 61/186; B65B 61/24; B65B 2220/06; B65B 2220/08; B65B 9/20; B65B 9/2028; B65B 9/2042; B65B 9/2056; B65B 9/213; B65B 9/22; B65B 51/10; B65B 57/00; B65B 51/303; B65D 75/008; B65D 75/12; B65D 75/48; B65D 75/5883; B65D 2207/00; B65D 2575/586; B31B 70/14; B31B 70/84

See application file for complete search history.

(56) References Cited

U.S. PATENT DOCUMENTS

| | | | | | |
|---|---|---|---|---|---|
| 7,546,722 | B2 * | 6/2009 | Tsuruta | ............... B29C 66/8225 53/551 |
| 9,371,146 | B2 * | 6/2016 | Tsuruta | ................. B65B 55/103 |
| 9,376,225 | B2 * | 6/2016 | Tsuruta | ............. B29C 66/81427 |
| 11,260,997 | B2 * | 3/2022 | Tsuruta | ...................... B65B 9/12 |
| 11,667,414 | B2 * | 6/2023 | Tsuruta | ................... B65B 41/16 53/562 |
| D996,979 | S * | 8/2023 | Tsuruta | .......................... D9/703 |

FOREIGN PATENT DOCUMENTS

| | | | |
|---|---|---|---|
| JP | 2002-19790 | A | 1/2002 |
| JP | 2009-208836 | A | 9/2009 |
| JP | 2015-217985 | A | 12/2015 |
| JP | 7137809 | B1 | 9/2022 |
| WO | 2020/100972 | A1 | 5/2020 |

OTHER PUBLICATIONS

Notice of Reasons for Refusal dated Jul. 12, 2022, issued in counterpart of Japanese Patent Application No. 2022-532810, with English Translation (4 pages).

Written Amendment dated Jul. 21, 2022, issued in counterpart of Japanese Application No. 2022- 532810, with English translation. (2 pages).

Decision to Grant a Patent dated Aug. 16, 2022, issued in counterpart of Japanese Patent Application No. 2022-532810, with English Translation (5 pages).

Written Opinion of the International Searching Authority (Form PCT/ISA/237) dated Apr. 12, 2022, issued in counterpart International Application No. PCT/JP2022/004372. (4 pages).

* cited by examiner

VERTICAL BAG-MAKING/FILLING/PACKAGING MACHINE, MANUFACTURING METHOD OF FILM PACKAGING BAG WITH CONTENT, AND FILM PACKAGING BAG WITH CONTENT

TECHNICAL FIELD

The present invention relates to a vertical bag-making/filling/packaging machine or the like for manufacturing a film packaging bag having a top gusset, a bottom gusset, and a spout portion protruding from the top gusset.

BACKGROUND ART

The vertical bag-making/filling/packaging machine forms a bag body from a band-shaped plastic film and fills a content in this bag body so as to continuously manufacture a film packaging bag with the content enclosed therein. The vertical bag-making/filling/packaging machine is often used for automatic packaging of food. It is also used for automatic packaging of detergents for baths, toilets and laundry.

As the film packaging bag filled with drinks, detergents and the like, a self-standing bag in which a gusset is provided on a bottom is manufactured. Such a packaging bag is called a standing pouch or the like and can be expected to have a strong display effects promoting sales because it can stand on its own on a display shelf.

The self-standing bag such as a standing pouch has an elliptic bottom and a flat top. Therefore, if they are packed upright in a cardboard box for transport, the loading efficiency (space capacity rate) is poor. Thus, a double-gusset bag with a gusset formed also on the top has been developed.

CITATION LIST

Patent Literature

Patent Literature 1: Japanese Patent Laid-Open No. 2009-208836

SUMMARY OF INVENTION

Technical Problem

For the conventional double-gusset bag, a bag-making process and a content-filling process are performed separately. Therefore, it is required to improve manufacture efficiency of the double-gusset bag by performing the bag-making and the filling at the same time by a vertical bag-making/filling/packaging machine.

Moreover, it was found that, if the double-gusset bag is manufactured by the vertical bag-making/filling/packaging machine, the filled amount of the content is not stable. The filled content is not stable when a shutter valve or a weight scale is not used at filling and when a squeezing roller is used at sealing (heat-welding) of the package bag. Particularly, it was found out that, if the double-gusset bag has a spout portion protruding from the top gusset, the filled amount is not stable.

The present invention has an object to provide a vertical bag-making/filling/packaging machine or the like which can efficiently manufacture a double-gusset bag.

Solution to Problem

Characteristically, a vertical bag-making/filling/packaging machine according to an embodiment of the present invention includes: a top folding portion which forms a first fold by folding a side of a band-shaped film into a Z-shape; a bottom folding portion which forms a second fold by folding a center of the film into an M-shape; a top seal portion which forms a top gusset and a spout portion protruding from the top gusset by heat-welding the first fold and side edges of the film so as to make the film into a tube shape; and a bottom-seal portion which forms a bottom gusset by heat-welding the second fold.

The top folding portion is characterized by including an auxiliary top seal portion which forms a part of the top gusset by heat-welding a mountain fold of the first fold.

Characteristically, the vertical bag-making/filling/packaging machine includes: a conveying portion which conveys the film downward; a filling portion which continuously throws the contents into the inside of the film; a correcting portion which corrects the filled shape of the film by sandwiching the film in a front-back direction after throwing the contents into the film; a squeezing roller portion which is disposed above the correcting portion and squeezes the film by pressing it in the front-back direction; a side-seal portion which is disposed below the correcting portion and forms a bag body by heat-welding the film in a lateral direction; and a cutter portion which cuts off the bag body from the film.

Characteristically, the correcting portion includes a first pair of correcting plates in close contact with a portion extending from the bottom gusset to the top gusset.

Characteristically, the first pair of correcting plates has a half-cylindrical shape, respectively.

Characteristically, the correcting portion includes a second pair of correcting plates in close contact with a portion extending from the top gusset to the spout portion.

Characteristically, the second pair of correcting plates includes: an extension piece extending in the lateral direction from one of the first pair of correcting plates; and a pressing piece protruding from the other of the first pair of correcting plates and facing the extension piece.

Characteristically, the vertical bag-making/filling/packaging machine includes a design cutter portion which trims an outer shape of the spout portion, and the spout portion has a cut-off piece, which would be cut off when opened.

Characteristically, the spout portion has a plug made of plastic, which is heat-welded between side edges of the film.

Characteristically, a method of manufacturing a film packaging bag with contents according to an embodiment of the present invention includes: a top folding step in which a first fold is formed by folding a side of a band-shaped film into a Z-shape; a bottom folding step in which a second fold is formed by folding a center of the film into an M-shape; a top seal step in which a top gusset and a spout portion protruding from the top gusset are formed by heat-welding the first fold and side edges of the film so as to make the film into a tube shape; and a bottom seal step in which a bottom gusset is formed by heat-welding the second fold.

Characteristically, the top folding step includes an auxiliary top seal step in which a mountain fold of the first fold is shaped into an arbitrary seal shape.

Characteristically, the method includes: a conveying step for conveying the film downward; a filling step for continuously throwing a content into an inside of the film; a correcting step for correcting a filled shape of the film by sandwiching the film by the correcting portion in a front-back direction; a squeezing step for pressing and squeezing the film in the front-back direction with a squeezing roller portion disposed above the correcting portion; a side seal step for forming a bag body by heat-welding the film in a lateral direction with the side-seal portion disposed below the correcting portion; and a cutting-off step for cutting off the bag body from the film by a cutter portion.

Characteristically, the film packaging bag with contents according to the embodiment of the present invention is made by filling and enclosing a fluid in the film packaging bag, the film packaging bag including: a top gusset in which films on a top surface of the film packaging bag overlap in an M-shape; a bottom gusset in which films on a bottom surface of the film packaging bag overlap in the M-shape; and a spout portion disposed on a top on one of two pleats of the top gusset, and among the two pleats, the first pleat on which the spout portion is disposed has a fold width larger than that of the other second pleat.

Characteristically, each of the first pleat and the second pleat has a seal which is formed by heat-welding the top thereof over a longitudinal direction.

Characteristically, the first pleat has a seal which is formed by heat-welding the top thereof over the longitudinal direction, and the second pleat does not have a seal which is formed by heat-welding the top thereof.

Characteristically, the seal has an arc shape with a center in the longitudinal direction being recessed toward the top.

Characteristically, both ends in the longitudinal direction of the two pleats are fixed to each other by heat-welding.

Characteristically, the spout portion has a cut-off piece formed by heat-welding side edges of the film, and the cut-off piece would be cut off for forming an opening through which the fluid is taken out.

Characteristically, the spout portion is a plug made of plastic, and the plug is disposed and fixed between the side edges of the film.

Advantageous Effects of Invention

The present invention makes it possible to manufacture the double gusset bag efficiently. Particularly, a filled amount of the double-gusset bag having a spout portion protruding from the top gusset can be made stable.

DESCRIPTION OF EMBODIMENTS

A vertical bag-making/filling/packaging machine 1 and a manufacturing method of a film packaging bag G with contents according to an embodiment of the present invention will be described below.

[Film Packaging Bag G with Contents]

Figure 1A:
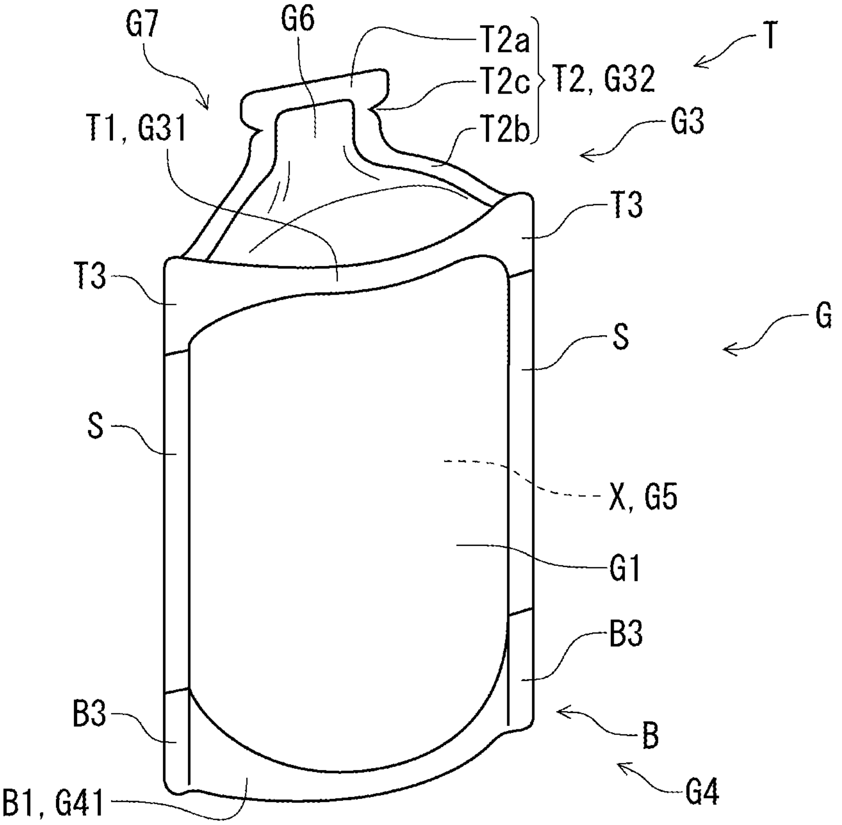
FIGS. 1(*a*) and 1(*b*) are views illustrating a film packaging bag G with contents according to an embodiment, in which FIG. 1(*a*) is a perspective view from an upper front direction, and FIG. 1(*b*) is a perspective view from a lower rear direction.
Figure 1B:
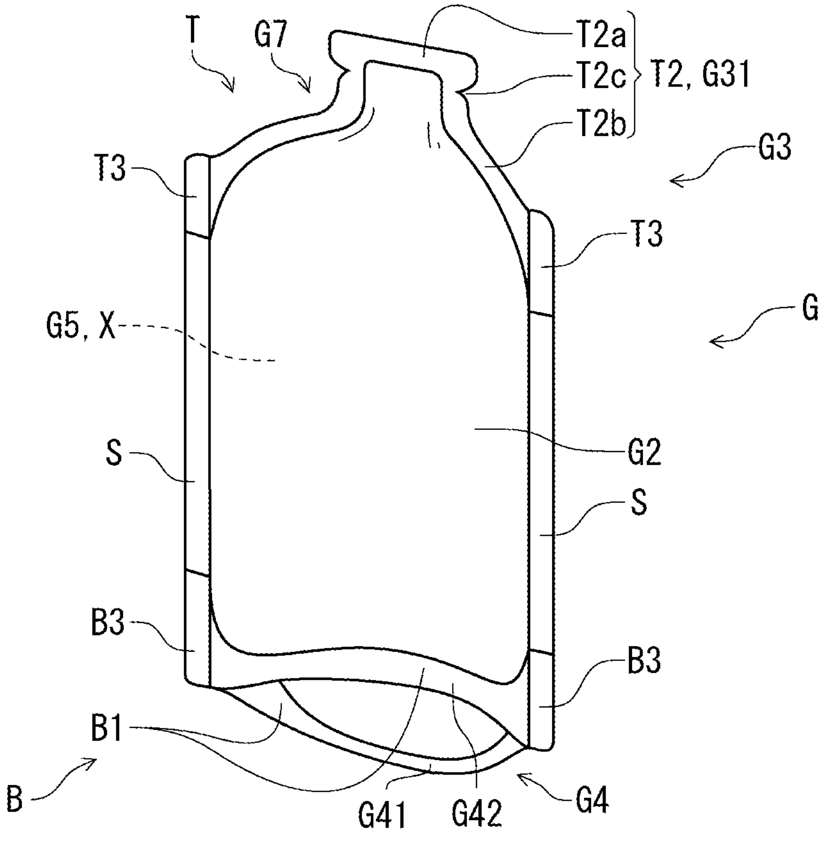

FIG. 1 are views illustrating a film packaging bag G with contents, and FIG. 1(*a*) is a perspective view from an upper front direction.

The film packaging bag G with contents is a bag body formed from a single plastic film F, which is filled with a content X.

The film packaging bag G is a so-called double-gusset bag and has a top gusset G3 on a top surface (upper part) and a bottom gusset G4 on a bottom surface (lower part).

A height direction when the film packaging bag G with contents is in an upright position is also referred to as an up-down direction. A width direction of the film packaging bag G with contents is also referred to as a left-right direction. A thickness direction (expanding direction) of the film packaging bag G with contents is also referred to as a front-back direction. In the film packaging bag G, a side of a surface having a cut-off piece T2*a* (rear surface G2) is referred to a rear.

The top gusset G3 has a first pleat G31 and a second pleat G32. The first pleat G31 and the second pleat G32 have different shapes. The first pleat G31 and the second pleat G32 have the same length in the left-right direction but different widths (fold width, depth) in the up-down direction. The second pleat G32 protrudes upward with respect to the first pleat G31. A plug G8 is disposed on a top (mountain fold) of the second pleat G32.

The bottom gusset G4 has a first pleat G41 and a second pleat G42. The first pleat G41 and the second pleat G42 have the same shape (rectangle). The first pleat G41 and the second pleat G42 have the same length in the left-right direction, and their widths in the up-down direction (fold width, depth) are uniform (the same) over the left-right direction.

The left and right ends of the top gusset G3 and the bottom gusset G4, respectively, are welded. That is, the left and right ends of the first pleat G31 and the second pleat G32, respectively, are connected, and the left and right ends of the first pleat G41 and the second pleat G42, respectively, are connected. Therefore, the film packaging bag G has a substantially elliptic columnar shape. In other words, the film packaging bag G has a section in a horizontal direction with a convex-lens shape or an almond shape.

The top gusset G3 has a top seal T formed along an outer peripheral edge of the top surface.

The top seal T consists of by three seals (a seal T1, a seal T2, and a seal T3).

The seal T1 is formed by heat-welding an upper end (mountain fold F3) of a front surface G1 (the first pleat G31) of the film packaging bag G.

The seal T2 is formed by heat-welding upper ends (side edges E1 and E2) of a rear surface G2 (the second pleat G32) of the film packaging bag G. The seal T2 has a cut-off piece T2*a* which would be cut off when the film packaging bag G is opened. Moreover, the seal T2 has a pair of inclined portions T2*b* connecting to the left and right ends of the cut-off piece T2*a*. A notch T2*c* is formed at a boundary between the cut-off piece T2*a* and the inclined portions T2*b*. The notch T2*c* is a starting point for tearing a film F to form an opening port (not shown).

The cut-off piece T2*a* and the pair of inclined portions T2*b* surround a narrow accommodating portion G6. The narrow accommodating portion G6 is an internal space exposed from the opening port formed by cutting off the cut-off piece T2*a*.

A spout portion G7 is where the opening port (opening) is formed. That is, the spout portion G7 is a portion protruding from the top gusset G3. Specifically, it consists of the cut-off piece T2*a* and upper ends of the pair of inclined portions T2*b* (the portions connected to the cut-off piece T2*a*).

The seal T3 is formed by heat-welding left and right ends of an upper part of the film packaging bag G (overlapping portion in which the film F is four-folded). The seal T3 connects (fixes) the left and right ends of the first pleat G31 and the second pleat G32, respectively, to each other.

The bottom gusset G4 has a bottom seal B formed along an outer peripheral edge of the bottom surface. The bottom seal B consists of three seals (a pair of seals B1, and a seal B3).

The pair of seals B1 is formed by heat-welding lower ends (mountain folds F7) of each of the front surface G1 (the first pleat G41) and the rear surface G2 (the second pleat G42) of the film packaging bag G. The pair of seals B1 have the same shape and are formed at the same time.

The seal B3 is formed by heat-welding the left and right ends of a lower part of the film packaging bag G (overlapping portion in which the film F is four-folded). The seal B3 connects (fixes) the left and right ends of the first pleat G41 and the second pleat G42, respectively, to each other.

When a sealant layer of the film F is disposed only on one surface (inner surface), the outer surfaces of the film F cannot be heat-welded even if the film F is four-folded. Thus, the first pleat G41 and the second pleat G42 are separated from each other. In order to make the film packaging bag G stable in an upright position, the left and right ends of the first pleat G41 and the second plate G42, respectively, need to be connected to each other.

Thus, punching holes may be provided in the portions where the outer surfaces of the film F are overlapped. The punching holes are provided on each outer surface so as to face each other when folded. As a result, even if the film F is four-folded, the inner surfaces (sealant layers) of the film F are brought into close contact with each other via the punching hole, whereby they are favorably heat-welded.

The bottom seal B (seals B1 and B3) is formed with a width wider than that of the top seal T (seals T1 and T2) to support (reinforce) the film packaging bag G with contents in an upright position.

In the film packaging bag G, portions (top surface and bottom surface) surrounded by the top seal T and the bottom seal B function as a folding gore of the film packaging bag G.

The film packaging bag G has a pair of side seals S extending in the up-down direction on the left and right ends. The side seal S has an upper end connected to the seal T3 of the top seal T and a lower end with the seal B3 of the bottom seal B.

Since the film packaging bag G has a folding gore on the top surface (the top gusset G3) and a folding gore on the bottom surface (the bottom gusset G4), it is likely to expand in the front-back direction so that the internal space (an accommodating portion G5) accommodating a content X can be made larger.

The accommodating portion G5 is a non-sealed portion (cylindrical film) of the film packaging bag G which is not heat-welded and is a space in which the content X is filled and enclosed. The accommodating portion G5 communicates with the narrow accommodating portion G6 formed in the second pleat G32 of the top gusset G3. The narrow accommodating portion G6 is a portion of the second pleat G32 of the top gusset G3 protruding above the first pleat G31.

The film F is a laminate film in which high-strength films such as nylon, polyester and the like are laminated. As the film F, a packaging film with excellent transection performance (straight cutting performance) is preferably used. That is, it is preferable to use such a film that the resulting film packaging bag G is easy to be cut in the left-right direction but hard to be cut in the up-down direction.

The content X is a liquid or a paste-state (semi-solid) beverage, food, chemical product, or the like. Specifically, the content X is a fluid such as drinking water, jelly, household detergents, and shampoo.

[Vertical Bag-Making/Filling/Packaging Machine 1]

Figure 2:
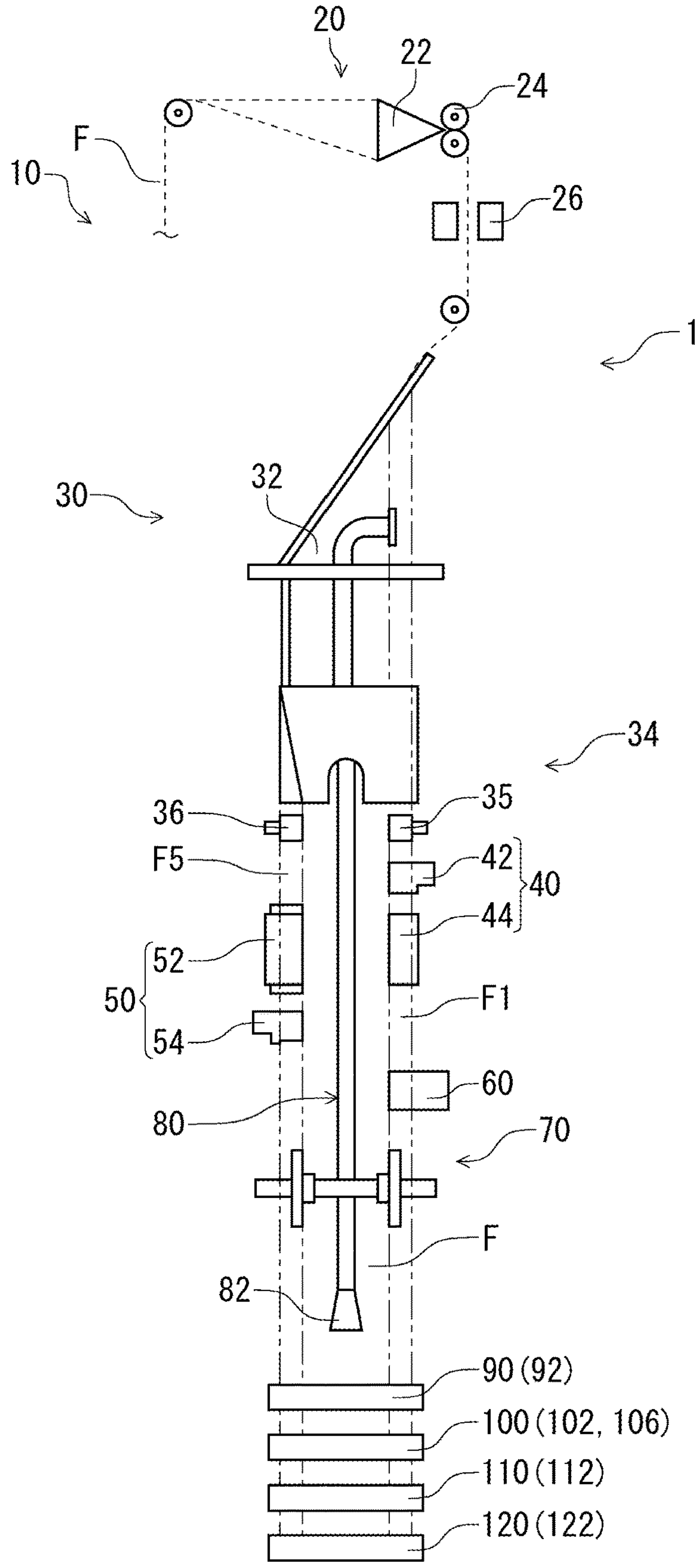
FIG. 2 is a front view illustrating a schematic configuration of a vertical bag-making/filling/packaging machine 1 according to the embodiment.

FIG. 2 is a front view illustrating a schematic configuration of a vertical bag-making/filling/packaging machine 1 according to the first embodiment.

The vertical bag-making/filling/packaging machine 1 forms a film packaging bag G of a double-gusset type from a band-shaped film F and fills a content X in this film packaging bag G at the same time.

The vertical bag-making/filling/packaging machine 1 fills the content X while intermittently conveying the film F downward under control by a control portion (not shown). The vertical bag-making/filling/packaging machine 1 fills the content X substantially fully so as to leave as little air as possible in the film packaging bag G.

The vertical bag-making/filling/packaging machine 1 neither include a measuring portion for measuring a filled mount of the content X nor a shutter valve for adjusting the filled amount.

The vertical bag-making/filling/packaging machine 1 manufactures the film packaging bag G with contents without variation in the filled amount of the content X while continuously filling the content X.

A longitudinal direction of the film F is also referred to as a conveying direction. A width direction of the film F is also referred to as a lateral direction. A thickness direction of the film F is also refereed to as an overlapping direction.

The longitudinal direction of the film F in the vertical bag-making/filling/packaging machine 1 is also referred to as a perpendicular direction, an up-down direction or a vertical direction. The lateral direction of the film F in the vertical bag-making/filling/packaging machine 1 is also referred to as a right-and-left direction. The thickness direction of the film F (the film packaging bag G) in the vertical bag-making/filling/packaging machine 1 is also referred to as a front-back direction.

The vertical bag-making/filling/packaging machine 1 includes: a film supply portion 10; a top folding unit 20; a bottom holding unit 30; a top seal portion 40; a bottom seal portion 50; a design cutter portion 60; a film conveying portion 70; a filling portion 80; a squeezing roller portion 90; a correcting portion 100; a side seal portion 110; a cutter portion 120; and the like.

[Film Supplying Portion 10]

The film supplying portion 10 lets out the film F from the roll (not shown) and passes it through the plurality of driven rollers and the like. The film supplying portion 10 feeds out the film F with a constant tension applied so that it is not loosened or meandered. The film supplying portion 10 supplies the film F towards the top folding unit 20.

[Top Folding Unit 20]

The top folding unit (top folding portion) 20 is disposed diagonally to the upper right of the film supply portion 10. The top folding unit 20 folds the band-shaped film F into a Z-shape. A side of the film F in the width direction (a side edge E1 side) is folded into the Z-shape, whereby a fold F1 for the top gusset is formed.

The fold (first fold) F1 for top gusset consists of a valley fold F2 on the side edge E1 side of the film F and a mountain fold F3 on a center side and is also referred to as three-fold. In the fold F1 for top gusset, one side of the first pleat G31 and one side of the second pleat G32 are formed at the same time.

The top folding unit 20 includes a folding-plate portion 22, a pressing roller portion 24, and an auxiliary top seal portion 26.

The folding-plate portion 22 has a plurality of plate members extending along a conveying direction (right direction) of the film F. The film F slides along these plate members. The folding-plate portion 22 pushes and bends a side of the film F (a side edge E1 side) downward, further pushes it toward the center, and then folds it into the Z-shape. It is folded so that a width from the valley fold F2 to the side edge E1 is larger than the width from the valley fold F2 to the mountain fold F3. It is formed so that the width of the second pleat G32 is larger than that of the first pleat G31 (i.e., they have different depths).

The pressing roller portion 24 is disposed on a downstream of the folding-plate portion 22 and consists of a pair of driven rollers. The pressing roller portion 24 presses a portion folded into the Z-shape by the pair of driven rollers in the up-down direction (overlapping direction) and creases the film F (the fold F1 for top gusset). The pressing roller portion 24 changes the conveying direction of the film F downward. That is, the film F is fed to the downward direction via the driven roller pair.

The auxiliary top seal portion 26 heat-welds the mountain fold F3 of the fold F1 for top gusset so as to form the seal T1. The auxiliary top seal portion 26 forms the seal T1 on the top of the first pleat G31 or the like.

The auxiliary top seal portion 26 has a pair of heater bars which sandwiches the mountain fold F3 and heat-welds the upper end of the first pleat G31 over the up-down direction. The auxiliary top seal portion 26 forms the seal T1 on the film F and assembles a part of the top gusset G3 (the first pleat G31).

The seal T1 is formed with a width in the up-down direction being small at the center and large on the both ends. The seal T1 is formed only on the top at the center in the up-down direction of the first pleat G31 while it is formed from the top to the base on the upper and lower ends.

As shown in FIGS. 1(*a*) and 1(*b*), the seal T1 is formed over the entire length in the left-right direction of the first pleat G31 when the film packaging bag G is in an upright position, and has an arc shape with the center in the left-right direction being recessed toward the upper direction (top). As a result, the film F is fed toward the downstream while maintaining the shape of the first pleat G31 without deflection or meandering during the conveyance.

[Bottom Folding Unit 30]

The bottom folding unit (bottom folding portion) 30 is disposed immediately below the top folding unit 20. The bottom folding unit 30 folds the band-shaped film F into a M-shape (W-shape). The center of the film F in the width direction is folded into the M-shape, whereby a fold F5 for the bottom gusset is formed.

The fold (second fold) F5 for the bottom gusset consists of a valley fold F6 at the center of the film F and a pair of mountain folds F7 on both sides thereof and is also referred to as accordion fold. In the fold F5 for the bottom gusset, the first pleat G41 and the second pleat G42 are formed at the same time.

The bottom folding unit 30 includes a folding-plate portion 32 and a pressing roller portion 34.

The folding-plate portion 32 has a plurality of plate members extending along the conveying direction of the film F. The film F slides along these plate members. The folding-plate portion 32 pushes both sides of the film F into a U-shape. Furthermore, the folding-plate portion 32 pushes the center of the film F inward and then folds it into the M-shape (W-shape). Thus, the fold F5 for the bottom gusset is formed on the left side of the film F.

In the fold F5 for the bottom gusset, the first pleat G41 and the second pleat G42 are formed at the same time. The fold F5 for the bottom gusset is folded so that the widths from the valley fold F6 to the mountain folds F7 are substantially the same. The first pleat G41 and the second pleat G42 of the fold F5 for the bottom gusset are formed to have the same width (uniform depth).

The pressing roller portion 34 is disposed on a downstream of the folding-plate portion 32 and consists of two pairs of driven rollers 35 and 36. The pair of driven rollers 35 disposed on the right side in FIG. 2 sandwiches the side edges E1 and E2 of the film F in the front-back direction (overlapping direction) and brings them into close contact with each other.

The pair of driven rollers 36 disposed on the left side in FIG. 2 presses a portion folded into the M-shape in the front-back direction (overlapping direction) and creases the film F (the fold F5 for the bottom gusset).

Then, the pressing roller portion 34 feeds the film F downward.

[Top Seal Portion 40]

The top seal portion 40 is disposed below the bottom folding unit 30. The top seal portion 40 heat-welds the side edges E1 and E2 of the film F to form the seal T2. By forming the seal T2 in the film F, the second pleat G32 is assembled, and the film F is made into a tube shape at the same time.

Moreover, the top seal portion 40 heat-welds the upper and lower ends of the first pleat G31 and the second pleat G32 (overlapping portion in which the film F is four-folded), respectively, to foim the seal T3 and assembles the top gusset G3.

The top seal portion 40 includes a first pair of top heater bars 42 disposed immediately below the pair of driven roller 35 and a second pair of top heater bars 44 disposed immediately below the first pair of top heater bars 42.

The first pair of top heater bars 42 sandwiches the upper and lower ends of the first pleat G31 and the second pleat G32 (overlapping portion in which the film F is four-folded), respectively, in the front-back direction and heat-welds them so as to form the seal T3.

The second pair of top heater bars 44 sandwiches the side edges E1 and E2 of the film F in the front-back direction and heat-welds them so as to form the seal T2.

The tube-shaped film F having the top gusset G3 is formed by the film F going through the top seal portion 40.

[Bottom Seal Portion 50]

The bottom seal portion 50 is disposed on the side (left side) and below the top seal portion 40. The bottom seal portion 50 heat-welds the fold F5 for the bottom gusset to form the bottom seal B. The bottom seal portion 50 assembles the bottom gusset G4 having the first pleat G41 and the second pleat G42.

The bottom seal portion 50 includes a first pair of bottom heater bars 52 disposed in parallel with the second pair of top heater bars 44 and a second pair of bottom heater bars 54 disposed immediately below the first pair of bottom heater bars 52.

The first pair of bottom heater bars 52 sandwiches each of the pair of mountain folds F7 of the fold F5 for the bottom gusset (the first pleat G41 and the second pleat G42) and heat-welds them so as to form a pair of seals B1.

The second pair of bottom heater bars 54 sandwiches the upper and lower ends of the first pleat G41 and the second pleat G42, respectively, and heat-welds them so as to form the seal B3. Then, the overlapped portion in which the film F is four-folded is heat-sealed, and the bottom gusset G4 is assembled.

The tube-shaped film F having the bottom gusset G4 is formed by the film F going through the bottom seal portion 50.

[Design Cutter Portion 60]

The design cutter portion 60 is disposed below the second pair of top heater bars 44. The design cutter portion 60 is disposed substantially in parallel with a second pair of bottom heater bars 54 of the bottom seal portion 50.

The design cutter portion 60 trims the outer shape of the top seal T (seal T2) formed by the top seal portion 40.

The design cutter portion 60 cuts off the outer edge side of the seal T2 so as to form the cut-off piece T2*a*, the pair of inclined portions T2*b*, and the notch T2*c* on the seal T2.

[Film Conveying Portion 70]

The film conveying portion 70 is disposed below the design cutter portion 60.

The film conveying portion 70 intermittently conveys the film F downward. The film conveying portion 70 includes two pair of drive rollers. The pairs of drive rollers are disposed on the right side and the left side of the film F, respectively. Each pair of the drive rollers is rotated while sandwiching the film F in the front-back direction and feeds the film F downward.

[Filling Portion 80]

The filling portion 80 continuously throws the content X into the inside (the accommodating portion G5 and the narrow accommodating portion G6) of the tube-shaped film F on the lower side of the film conveying portion 70.

The filling portion 80 includes a filling pump (not shown) and a filling nozzle 82. The filling pump pumps the content X toward the filling nozzle 82.

The filling nozzle 82 is inserted into the inside of the film F folded into the U-shape from the side (right side) of the bottom folding unit 30. The filling nozzle 82 extends straightly downward from the bottom folding unit 30 and reaches below the film conveying portion 70.

The filling portion 80 drives the filling pump to continuously discharge the content X from the filling nozzle 82 toward the inside of the tube-shaped film F.

[Squeezing Roller Portion 90]

The squeezing roller portion 90 is disposed below the filling nozzle 82 and squeezes the tube-shaped film F filled with the content X.

The squeezing roller portion 90 includes a pair of squeezing rollers 92 extending in the left-right direction and feeds the tube-shaped film F downward with sandwiching it by the pair of squeezing rollers in the front-back direction. As a result, the content X filled in the tube-shaped film F is vertically divided by the pair of squeezing rollers. The tube-shaped film F is made flat and is conveyed toward the side seal portion 110. This makes it possible to reliably form the side seal S on the film F.

[Correcting Portion 100]

Figure 3A:
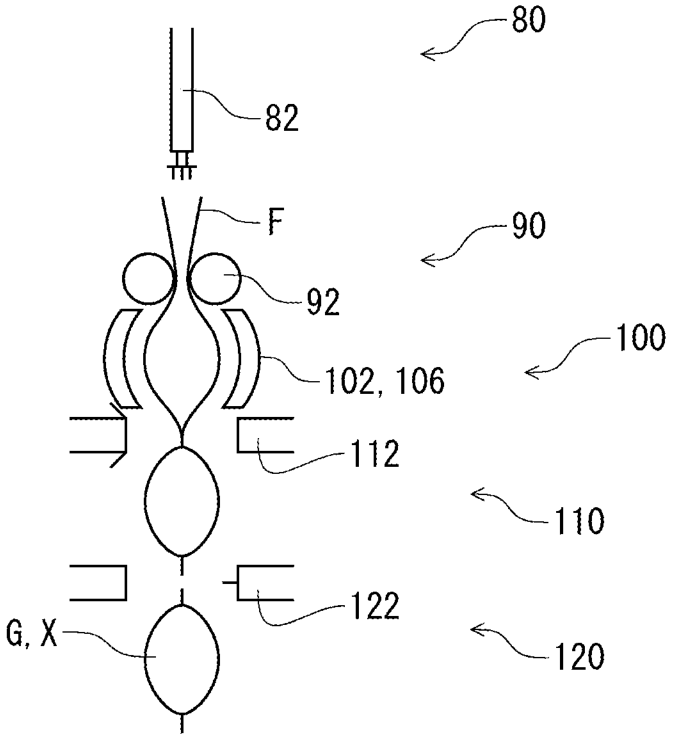
FIGS. 3(*a*) and 3(*b*) are views illustrating a correcting portion 100, in which FIG. 3(*a*) is a side view and FIG. 3(*b*) is a perspective view.
Figure 3B:
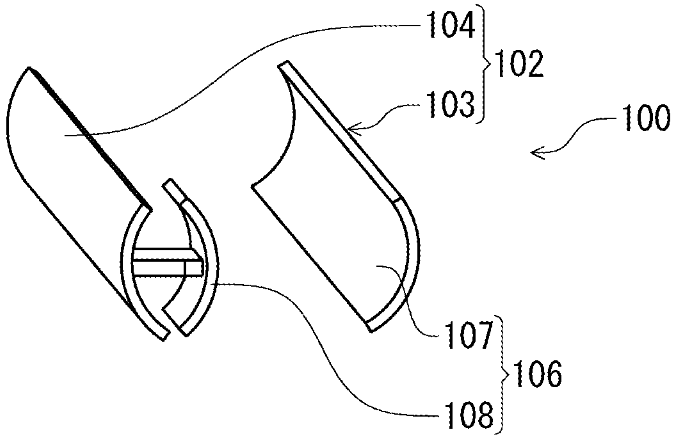
Figure 4A:
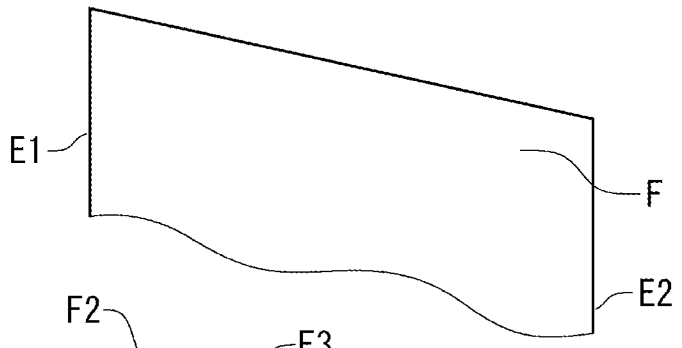
FIGS. 4(*a*)-4(*e*) are schematic diagrams illustrating a top folding step S2 and a bottom folding step S3 in a manufacturing method of a film packaging bag G with contents according to the embodiment in order of the steps.
Figure 4B:
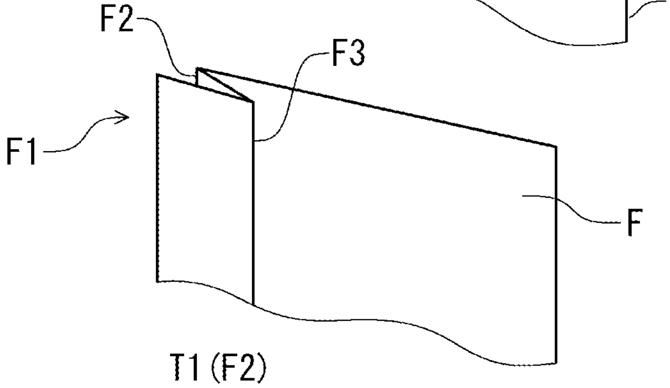
Figure 4C:
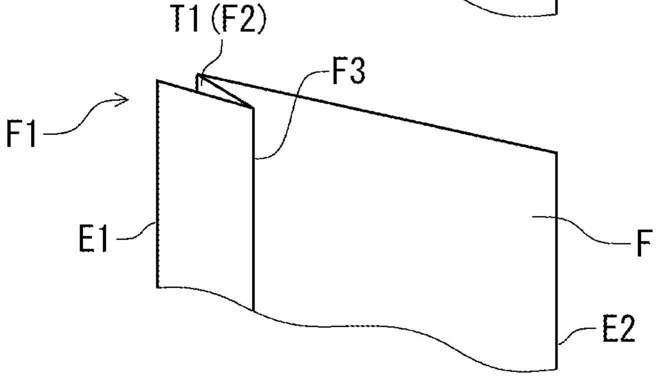
Figure 4D:
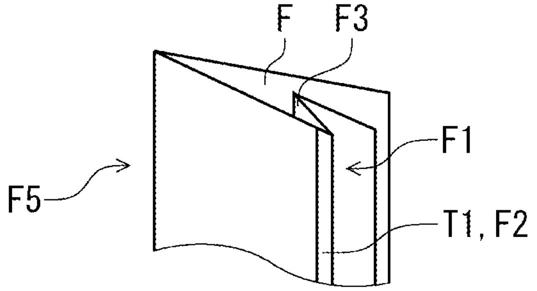
Figure 4E:
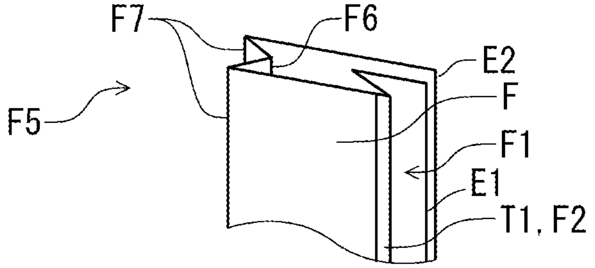

FIGS. 3(*a*) and (3*b*) are views illustrating a correcting portion 100, in which FIG. 3(*a*) is a side view and FIG. 3(*b*) is a perspective view.

The correcting portion 100 is disposed immediately below the squeezing roller portion 90 and corrects a filled shape of the tube-shaped film F filled with the content X.

The correcting portion 100 presses the filled shape of the tube-shaped film F from the front-back direction before the squeezing roller portion 90 is operated. The content X is reliably spread to the top gusset G3 and the bottom gusset G4 of the tube-shaped film F. Then, the filled amount of the content X enclosed in the tube-shaped film F is made stable.

The correcting portion 100 includes a first pair of correcting plates 102 and a second pair of correcting plates 106.

The first pair of correcting plates 102 presses a portion (accommodating portion G5) of the tube-shaped film F extending from the bottom gusset G4 to the top gusset G3. The first pair of correcting plates 102 consists of plate members 103 and 104 extending in the left-right direction and disposed to face each other with sandwiching the film F in the front-back direction.

The plate members 103 and 104 are symmetrical with respect to the film F. Specifically, the plate members 103 and 104 have a half-cylindrical shape and forms a substantially elliptic space between them when they approach each other. That is, when the film F filled with the content X is pressed by the plate members 103 and 104, the filled shape of the film F is corrected to the substantially elliptic shape.

The second pair of correcting plates 106 presses flat the spout portion G7 protruding from the top gusset G3. The spout portion G7 is a portion from the top gusset G3 to the cut-off piece T2*a*. That is, the second pair of correcting plates 106 presses flat the narrow accommodating portion G6 surrounded by the seal T2 (the cut-off piece T2*a* and the upper ends of the pair of inclined portions T2*b*).

The second pair of correcting plates 106 includes an extension piece 107 and a pressing piece 108.

The extension piece 107 is a portion extending from the plate member 103 (one of the first pair of correcting plates 102) to the right direction and has a half-cylindrical shape similarly to the extension piece 107. The pressing piece 108 is a member protruding from the plate member 104 (the other of the first pair of correcting plates 102) to the rear side and facing the extension piece 107 and has a half-cylindrical shape similarly to the extension piece 107.

The extension piece 107 and the pressing piece 108 are moved and brought into close contact as the plate members 103 and 104 approaches each other. The close contact between the extension piece 107 and the pressing piece 108 presses the narrow accommodating portion G6 flat and pushes out the content X toward the accommodating portion G5. Air accumulated in the narrow accommodating portion G6 is also pushed out toward the accommodating portion G5.

After the correcting portion 100 presses the tube-shaped film F, the squeezing roller portion 90 presses the film F flat. As a result, the filled amount of the content X enclosed in the film F is made stable.

[Side Seal Portion 110]

The side seal portion 110 is disposed below the correcting portion 100. The side seal portion 110 heat-welds the film F pressed flat by the squeezing roller portion 90 so as to form the side seal S. A lower part of the film F is sealed by the side seal S so that a complete bag body (film packaging bag G) is formed.

Moreover, the side seal portion 110 also forms the side seal S of the subsequent film packaging bag G. The side seal S of a tube-shaped film F becomes a bottom of another tube-shaped film F in the upper direction thereof.

The side seal portion 110 includes a pair of side heater bars 112. The pair of side heater bars 112 extends in the left-right direction and is disposed to face each other with sandwiching the film F in the front-back direction.

The pair of side heater bars 112 heat-welds the tube-shaped film F so as to form the side seal S. The side seal S is formed so that the left and right ends overlap the seal T3 and the seal B3. As a result, the tube-shaped film F is sealed over the left-right direction, and the lower end of the film F becomes the bag body (film packaging bag G).

[Cutter Portion 120]

The cutter portion 120 is disposed below the side seal portion 110. The cutter portion 120 cuts off the bag body (film packaging bag G) from the film F.

The cutter portion 120 includes a pair of cutter bars 122. The pair of cutter bars 122 extends in the left-right direction and is disposed to face each other with sandwiching the film F in the front-back direction. The pair of cutter bars 122 divides the side seal S (including the seal T3 and the seal B3) of the film F into two parts in the up-down direction. As a result, the film packaging bag G is cut off from the film F.

[Manufacturing Method of Film Packaging Bag G with Contents]

Subsequently, a step of manufacturing the film packaging bag G with contents by using the vertical bag-making/filling/packaging machine 1 will be described.

FIGS. 4(*a*)-(4*e*) are schematic diagrams illustrating a top folding step S2 and a bottom folding step S3 in a manufacturing method of the film packaging bag G with contents in order of the steps and shows a form (folded shape) of the film F.

Figure 5A:
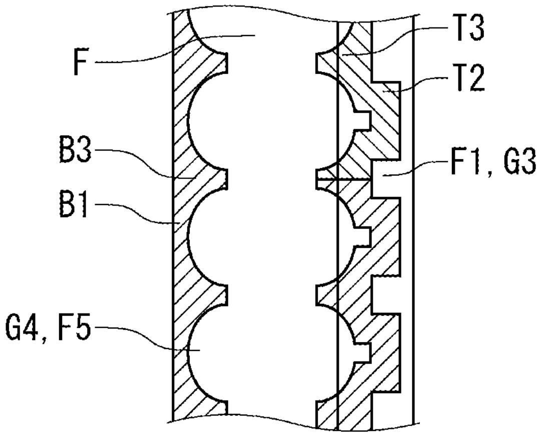
FIGS. 5(*a*)-5(*c*) are schematic diagrams illustrating from a top seal step S4 to a separation step S11 in the manufacturing method of the film packaging bag G with contents according to the embodiment in order of the steps.
Figure 5B:
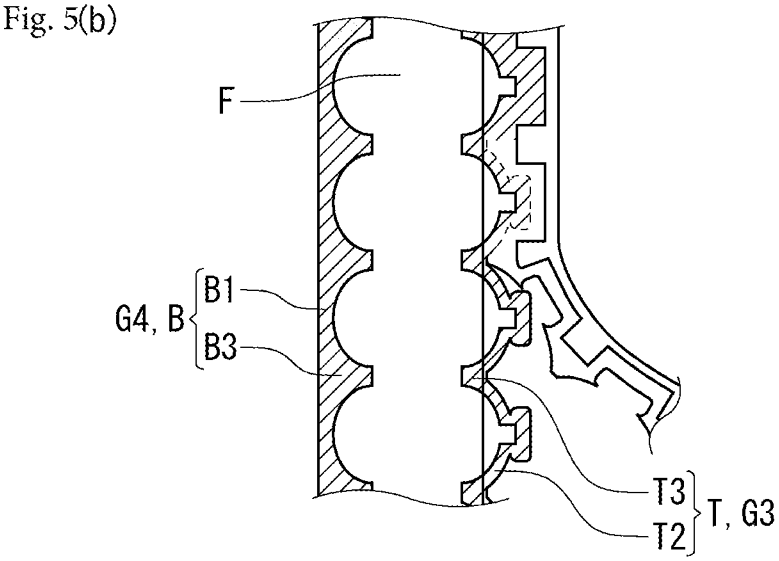

FIGS. 5(*a*)-5(*c*) are schematic diagrams illustrating from a top seal step S4 to a separation step S11 in the manufacturing method of the film packaging bag G with contents in order of the steps and shows a form of the film F. For convenience of explanation the seal T1 is not shown in FIGS. 5(*a*)-5(*c*).

Figure 6A:
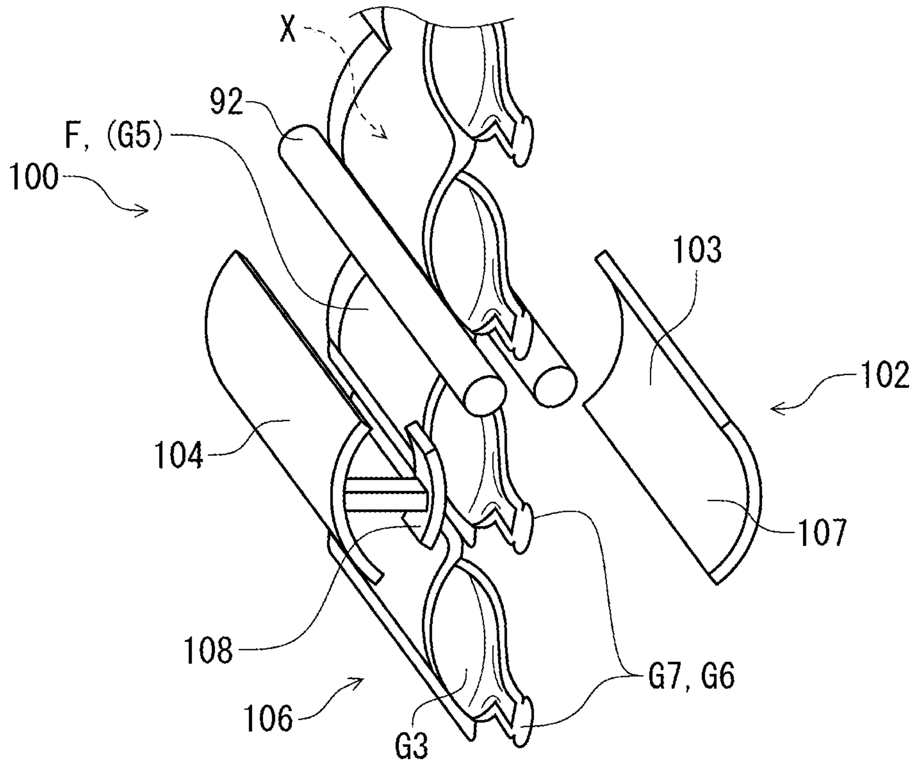
FIGS. 6(*a*) and 6(*b*) are schematic diagrams illustrating a correcting step S8 in the manufacturing method of the film packaging bag G with contents according to the embodiment in order of the steps.
Figure 6B:
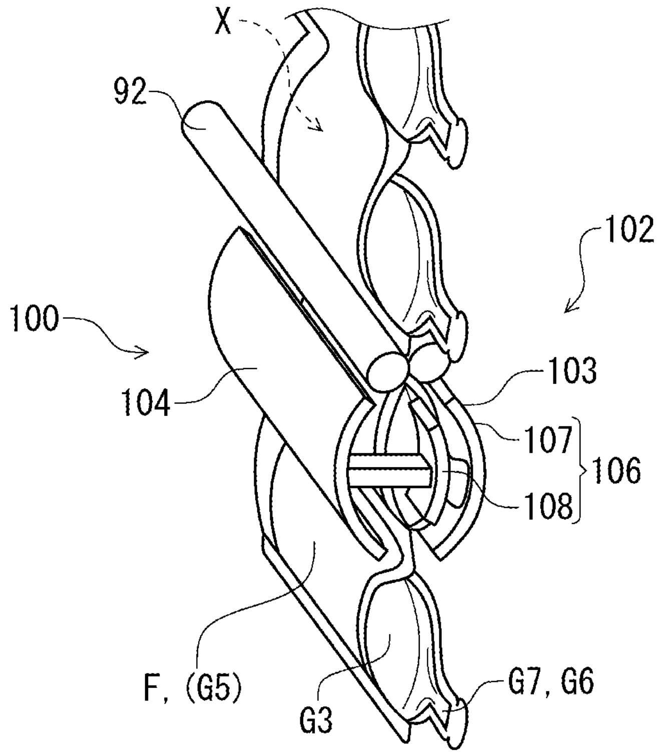

FIGS. 6(*a*)-6(*b*) are perspective views illustrating a correcting step S8 in the manufacturing method of the film packaging bag G with contents in order of the steps.

The steps of manufacturing the film packaging bag G with contents includes a film supply/conveyance step S1, a top folding step S2, a bottom folding step S3, a top seal step S4, a bottom seal step S5, a design-cut step S6, a filling step S7, a correcting step S8, a squeezing step S9, a side seal step S10, and a separation step S11.

These steps are performed in the following order: the film supply/conveyance step S1, the top folding step S2, the bottom folding step S3, the top seal step S4, the bottom seal step S5, the design-cut step S6, the side seal step S10, the filling step S7, the correcting step S8, the squeezing step S9, the side seal step S10, and the separation step S11.

(Film Supply/Conveyance Step S1)

First, the band-shaped film F is fed out from a roll of the film supply portion 10. The film conveying portion 70 intermittently conveys the film F toward the downstream side. The film F is sent out at a certain pitch. One pitch is the same as the length of the film packaging bag G in the left-right direction (lateral direction).

The film supply/conveyance step (conveying step) S1 is performed continuously.

(Top Folding Step S2)

As shown in FIGS. 4(*a*) and 4(*b*), the film F is folded with the one side in the width direction (side edge E1 side) into the Z-shape (N-shape) in the top folding unit 20. In the film F, the fold F1 for top gusset is formed via the folding-plate portion 22 and the pressing roller portion 24.

Moreover, as shown in FIG. 4(*c*), in the film F, the seal T1 is formed on the mountain fold F3 (top of the first pleat G31 and the like) of the fold F1 for top gusset via the auxiliary top seal portion 26 (auxiliary top seal step S2B). As a result, the first pleat G31 is formed on the fold F1 for top gusset.

(Bottom Folding Step S3)

Subsequently, as shown in FIG. 4(*d*), the film F has both sides pressed at a folding-plate portion 32 of the bottom folding unit 30 and is folded (twofold) into a II-shape. Subsequently, as shown in FIG. 4E, in the film F, the center of the film F is pushed in the inner side and folded into an M-shape (W-shape) in the folding-plate portion 32, whereby the fold F5 for bottom gusset is formed.

Moreover, in the film F, the fold F1 for top gusset and the fold F5 for bottom gusset are squeezed via the pressing roller portion 34 of the bottom folding unit 30 and are made flat.

(Top Seal Step S4)

Subsequently, as shown in FIG. 5(*a*), the top seals T (seals T2 and T3) are formed in the film F at the top seal portion 40.

As the seal T2 are formed in the film F, the second pleat G32 is assembled, and the film F is made into a tube shape at the same time. As the seal T3 are formed in the film F, the upper and lower ends of the first pleat G31 and the second pleat G32 (overlapping portion in which the film F is four-folded), respectively, are connected so as to assemble the top gusset G3.

First, the first pair of top heater bars 42 heat-welds the upper and lower ends of the first pleat G31 and the second pleat G32 (overlapping portion in which the film F is four-folded), respectively, so as to form the seal T3.

Then, the second pair of top heater bars 44 heat-welds the side edges E1 and E2 of the film F so as to form the seal T2.

The film F goes through the top seal portion 40 to form a tube, and the top gusset G3 is assembled.

(Bottom Seal Step S5)

Subsequently, as shown in FIG. 5(*a*), the bottom seals B (seals T1 and T3) are formed in the film F at the bottom seal portion 50.

First, the first pair of bottom heater bars 52 heat-welds each of a pair of mountain folds F7 of the fold F5 for the bottom gusset (the first pleat G41 and the second pleat G42) so as to a pair of seals B1.

Then, the second pair of bottom heater bars 54 heat-welds the upper and lower ends of the first pleat G41 and the second pleat G42 (overlapping portion in which the film F is four-folded), respectively, so as to form the seal B3.

The film F goes through the bottom seal portion 50 and the bottom gusset G4 is assembled.

(Design-Cut Step S6)

Subsequently, as shown in FIG. 5(*b*), the outer shape of the seal T2 in the film F is trimmed in the design cutter portion 60.

In the film F, an outer edge side of the seal T2 is cut off by the design cutter portion 60, and the cut-off piece T2*a*, the pair of inclined portions T2*b*, and the notch T2*c* are formed in the seal T2.

(Side Seal Step S10)

Subsequently, as shown in FIG. 5(*c*), the side seal S is formed in the film F at the side seal portion 110. The side seal portion 110 heat-welds the film F by the pair of side heater bars 112 so as to form the side seal S.

Thereby the bottom of the tube-shaped film F is formed.

(Filling Step S7)

Subsequently, the film F is filled with the content X by the filling portion 80. When the film F is sandwiched by the pair of side heater bars 112, the content Xis discharged from the filling nozzle 82 and is filled inside the film F.

(Correcting Step S8)

Subsequently, as shown in FIGS. 6(*a*) and 6(*b*), the film F has the filled shape corrected by the correcting portion 100. The film F is pressed by the first pair of correcting plates 102 and the second pair of correcting plates 106 from the front-back direction in a state filled with the content X. As a result, the content X unevenly distributed inside the film F spreads to each corner of the inside of the film F.

The first pair of correcting plates 102 presses a portion (accommodating portion G5) extending from the bottom gusset G4 to the top gusset G3. Since the plate members 103 and 104 have symmetric half-cylindrical shapes with the film F between them, the filled shape of the film F is corrected to a substantially elliptic shape.

At the same time as the first pair of correcting plates 102 presses the film F (accommodating portion G5), the second pair of correcting plates 106 presses the portion (narrow accommodating portion G6) protruding from the top gusset G3.

The second pair of correcting plates 106 presses the film F (narrow accommodating portion G6) flat by the extension piece 107 and the pressing piece 108.

As a result, the content X is pushed out from the narrow accommodating portion G6 toward the accommodating portion G5.

(Squeezing Step S9)

Figure 5C:
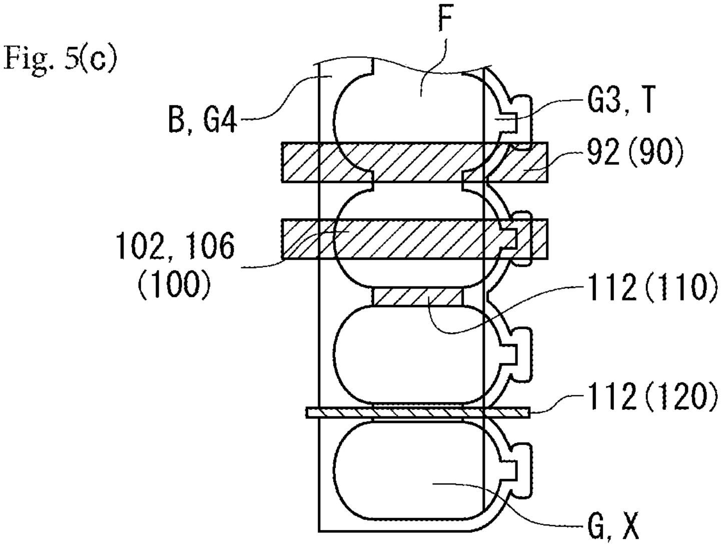

Subsequently, as shown in FIG. 5C, the film F is squeezed by the squeezing roller portion 90. The film F is sandwiched by the squeezing roller pair 92 disposed immediately above the correcting portion 100.

The squeezing roller pair 92 waits while slightly separating from each other until the correcting portion 100 presses the film F. Then, after the filled shape of the film F is corrected by the correcting portion 100, the squeezing roller pair 92 is brought into close contact and presses the film F flat. As a result, the filled amount of the content X enclosed in the film F is made stable (fixed).

Subsequently, when the correcting portion 100 separates away from the film F, the film F is sent downward. The squeezing roller pair 92 maintains the state where the film F is pressed down. As a result, extra contents X remain in the upper direction of the squeezing roller pair 92.

(Side Seal Step S10)

Subsequently, as shown in FIG. 5C, in the film F, the side seal S is formed in the side seal portion 110. The pair of side heater bars 112 heat-welds the film F pressed flat by the squeezing roller pair 92 and forms the side seal S. As a result, the lower end of the film F becomes a complete bag body (film packaging bag G).

(Separation Step S11)

Subsequently, as shown in FIG. 5C, in the film F (film packaging bag G), the side seal S is cut off in the cutter portion 120. The side seal S is divided into upper and lower two parts, and the film packaging bag G with contents is cut off from the film F.

As described above, the step of manufacturing the film packaging bag G with contents is completed.

The vertical bag-making/filling/packaging machine 1 repeats the steps of manufacturing the film packaging bag G with contents. As a result, the vertical bag-making/filling/packaging machine 1 continuously manufactures a plurality of the film packaging bags G with contents.

As described above, the vertical bag-making/filling/packaging machine 1 includes the top folding unit 20 which folds the band-shaped film F into the Z-shape, the bottom folding unit 30 which folds the film F into the M shape, the top seal portion 40 which makes the film F into the tube shape and forms the top gusset G3 and the spout portion G7, the bottom seal portion 50 which forms the bottom gusset G4, and the design cutter portion 60 which trims the outer shape of the spout portion G7.

As a result, the vertical bag-making/filling/packaging machine 1 performs the bag-making of the film packaging bag G and the filling of the content X at the same time. Therefore, the double-gusset bag having the top gusset G3 and the bottom gusset G4 can be manufactured efficiently.

The top folding unit 20 includes the auxiliary top seal-portion 26 and forms a part of the top gusset G3 (seal T1) by heat-welding the mountain fold F3 (first pleat G31) of the fold F1 for top gusset.

As a result, the vertical bag-making/filling/packaging machine 1 can favorably manufacture the film packaging bag G with contents having the top gusset G3. Particularly, since the shape of the seal T1 can be set arbitrarily, the film packaging bag G suitable for various applications can be manufactured.

The vertical bag-making/filling/packaging machine 1 includes the squeezing roller portion 90, the correcting portion 100, and the side seal portion 110. The correcting portion 100 corrects the filled shape of the film F by sandwiching the film F into which the content X was from the front-back direction. The squeezing roller portion 90 squeezes the film F by pressing it from the front-back direction. The side seal portion 110 heat-welds the film F in the lateral direction and forms the bag body (film packaging bag G). As a result, the vertical bag-making/filling/packaging machine 1 can manufacture the film packaging bag G with contents, in which the top gusset G3, the bottom gusset G4, and the spout portion G7 are formed, while the filled amount is fixed.

The correcting portion 100 includes the first pair of correcting plates 102 in close contact with the portion (accommodating portion G5) extending from the bottom gusset G4 to the top gusset G3. The first pair of correcting plates 102 consists of the plate members 103 and 104 having the half-cylindrical shape, respectively. As a result, the vertical bag-making/filling/packaging machine 1 can favorably correct the filled shape of the film F.

The correcting portion 100 includes the second pair of correcting plates 106 in close contact with the portion (narrow accommodating portion G6) from the top gusset G3 to the spout portion G7. The second pair of correcting plates 106 consists of the extension piece 107 extending laterally from the plate member 103 and the pressing piece 108 protruding from the plate member 104 and facing the extension piece 107. As a result, the vertical bag-making/filling/packaging machine 1 can push out the content X and the air from the narrow accommodating portion G6. By not filling the narrow accommodating portion G6 with the content X, fixation of the filled amount of the film packaging bag G is improved.

Figure 7:
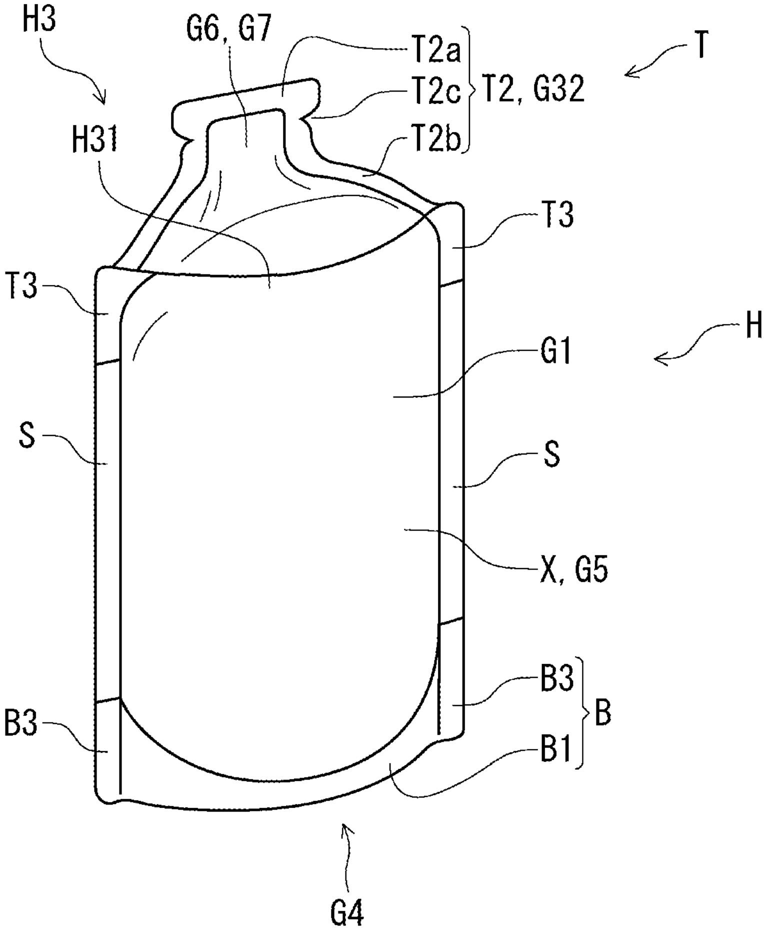
FIG. 7 is a perspective view illustrating a first variation of the film packaging bag with contents.

FIG. 7 is a perspective view illustrating a first variation (film packaging bag H with contents) of the film packaging bag with contents.

The film packaging bag H with contents has a top gusset H3, a bottom gusset G4, and a spout portion G7 similarly to the film packaging bag G with contents.

However, unlike the top gusset G3, the top gusset H3 does not have the seal T1 of the top seal T. That is, the mountain fold F3 of the fold F1 for top gusset (top of a first pleat H31) is not heat-welded.

The film packaging bag H with contents is suitable for applications in which the content X is food such as drink water, and a consumer holds an opening port thereof in the mouth.

With the film packaging bag G with contents, if a front surface G1 is directed upward, when the consumer holds the opening port in the mouth, the seal T1 of the top gusset G3 (first pleat G31) hits the nose and thus, there is a concern that it makes the consumer uncomfortable. If the front surface G1 is directed downward, when the consumer holds the opening port in the mouth, the seal T1 of the top gusset G3 hits the chin and thus, there is a concern that it makes the consumer uncomfortable.

On the other hand, the film packaging bag H with contents does not have the seal T1 in the first pleat G31 of the top gusset G3, but only the soft first pleat G31 hits the nose or the chin and thus, it does not make the consumer uncomfortable.

As described above, with the vertical bag-making/filling/packaging machine 1, the auxiliary top seal portion 26 of the top folding unit 20 can heat-weld the mountain fold F3 of the fold F1 for top gusset (first pleat G31) into an arbitrary seal shape (auxiliary top seal step S2B). It can be also set such that the first pleat G31 (mountain fold F3) is not heat-welded. That is, since the vertical bag-making/filling/packaging machine 1 can set presence/absence of the seal T1 and the shape thereof arbitrarily, the film packaging bag H suitable for food (drink water) can be manufactured.

Figure 8:
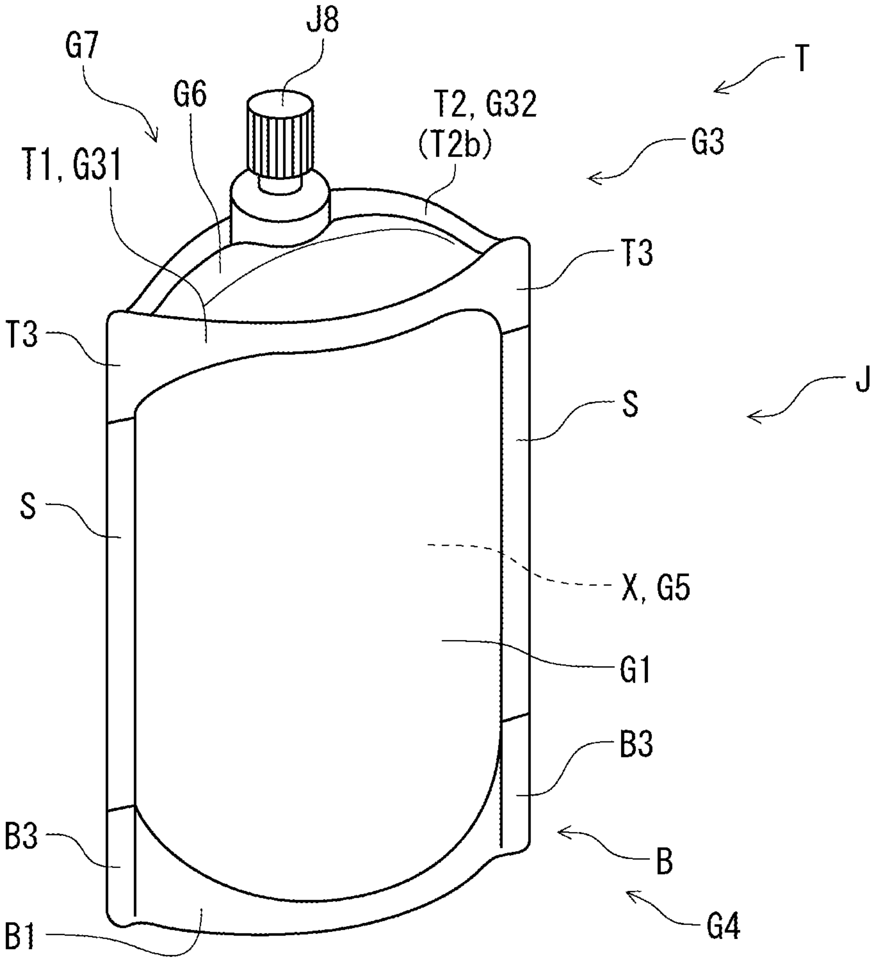
FIG. 8 is a perspective view illustrating a second variation of the film packaging bag with contents.

FIG. 8 is a perspective view illustrating a second variation (film packaging bag J with contents) of the film packaging bag with contents.

Figure 9:
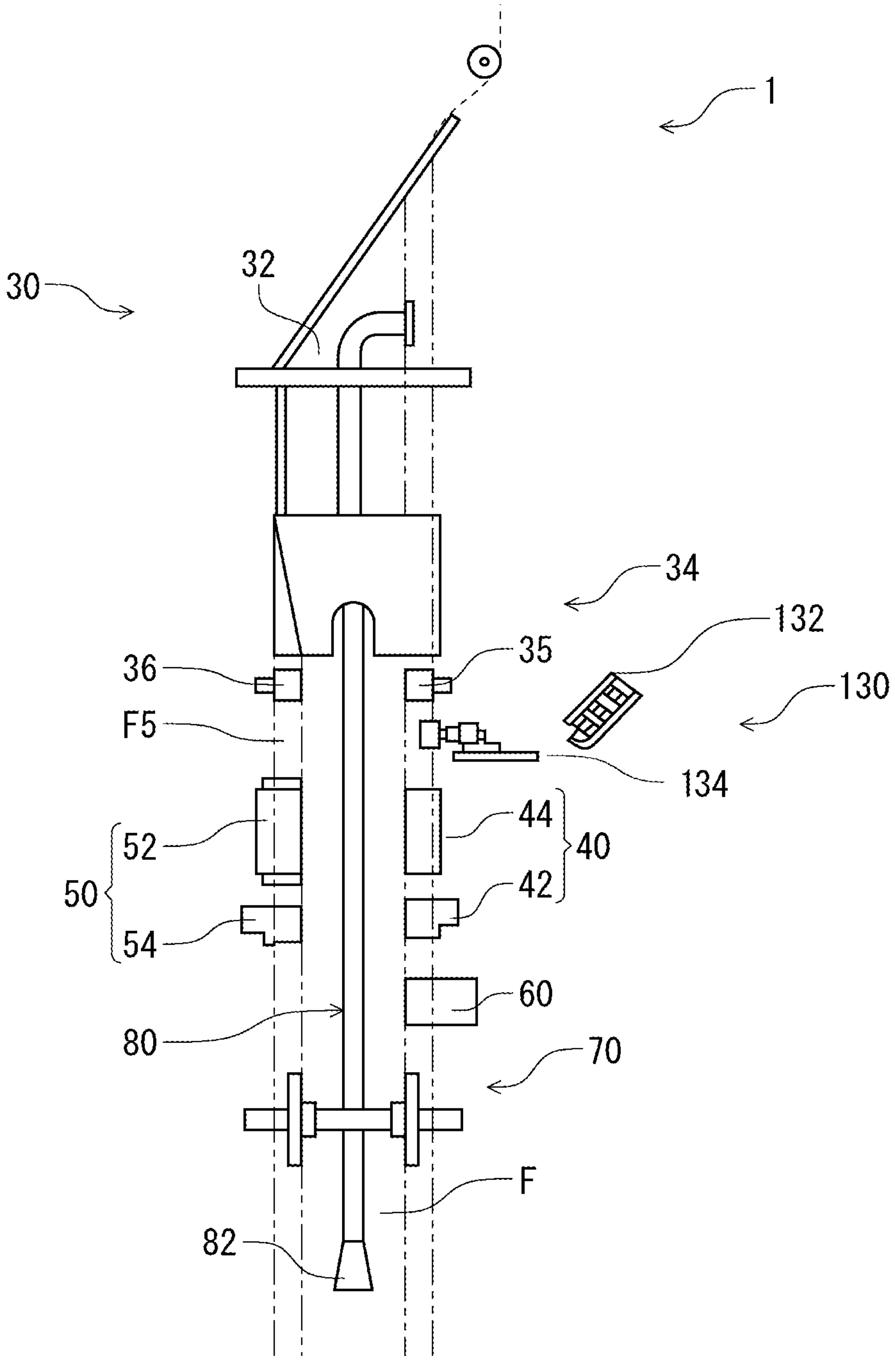
FIG. 9 is an enlarged front view illustrating a variation of a vertical bag-making/filling/packaging machine.

FIG. 9 is an enlarged front view illustrating a variation of the vertical bag-making/filling/packaging machine 1.

The film packaging bag J with contents includes a plug J8 made of plastic instead of the cut-off piece T2*a*. That is, the plug J8 is welded to an upper end of the spout portion G7. The plug J8 consists of a nozzle communicating with the narrow accommodating portion G6 and a cap screwed with this nozzle, and a base end of the nozzle is sandwiched by both edges of a pair of the film F (inclined portion T2*b*) and welded. And by removing the cap from the nozzle of the plug J8, the film packaging bag J with contents is opened.

The second pleat G32 is formed with a folding width (length in the up-down direction) larger than that of the first pleat G31. The narrow accommodating portion G protrudes above the first pleat G31.

As shown in FIG. 9, the vertical bag-making/filling/packaging machine 1 includes a plug mounting portion 130. The plug mounting portion 130 includes a plug supply portion 132 and a plug fusing portion 134, and they are disposed immediately below the driven roller pair 35.

When the plug mounting portion 130 is provided, the second pair of top heater bars 44 is disposed immediately below the first pair of top heater bars 42. Moreover, in accordance with a protruding length of the narrowing accommodating portion G6 (spout portion G7), presence/absence or a shape of the second pair of correcting plates 106 of the correcting portion 100 is changed. If the protruding length of the narrow accommodating portion G6 (distance from the top gusset G3 to the plug J8) is small, the second pair of correcting plates 106 interferes with the plug J8 and thus, the second pair of correcting plates 106 is abolished.

On the other hand, if the protruding length of the narrow accommodating portion G6 is sufficiently long, the second pair of correcting plates 106 is formed with a shape not interfering with the plug J8, and the content X and the air are pushed out of the narrow accommodating portion G6.

When the film packaging bag J with contents is to be manufactured, between the bottom folding step S3 and the top seal step S4, a plug mounting step S12 is performed. In the plug mounting step S12, the plug mounting portion 130 heat-welds the plug J8 (base end of the nozzle) between the side edges E1, E2 of the pair of films F.

As described above, the spout portion G7 may have a cut-off piece T2*a* which is cut off at opening or may have the plug J8 made of plastic and consists of the cap and the nozzle.

Moreover, in either case of the cut-off piece T2*a* and the plug J8, the protruding length (distance from the top gusset G3 to the cut-off piece T2*a*, the plug J8) of the narrow accommodating portion G6 can be set arbitrarily. And in accordance with the protruding length or the shape of the narrow accommodating portion G6, presence/absence and a shape of the second pair of correcting plates 106 of the correcting portion 100 can be also set arbitrarily.

The film packaging bags G, H, J with a content X include the spout portion G7 at one (first pleat G31) of the tops of the two pleats (first pleat G31, second pleat G32) held by the top gusset G3. In the two pleats, the second pleat G32 on which the spout portion G7 is disposed has a folding width larger than that of the other first pleat G31. That is, the spout portion G7 of the second pleat G32 protrudes above the first pleat G31. Thus, the consumer can easily hold the opening port (spout portion G7) in the mouth. Moreover, the spout portion G7 (plug G8 and the cut-off piece T2*a*) is favorably formed without defective welding on the top of the second pleat G32.

The present invention is not limited to the aforementioned embodiment but includes those with various modifications added to the aforementioned embodiment within a range not departing from the gist of the present invention. That is, specific shapes, configurations and the like cited in the aforementioned embodiment are only examples and capable of appropriate changes.

The correcting portion 100 is not limited to those which includes the second pair of correcting plates 106 in close contact with the narrow accommodating portion G6. That is, the correcting portion is not limited to those which push the content X out from the narrow accommodating portion G6 by the second pair of correcting plates 106 but may perform full filling by which the content X spreads even to the narrow accommodating portion G6.

The film F is not limited to a band shape but may be an inflation film or the like. That is, the present invention is not limited to a case where the side edges E1 and E2 of the band-shaped film F are heat-welded into a tube shape. In addition, a plurality of the band-shaped films may be pasted together to form a tube-shaped film.

The content X is not limited to a liquid or a fluid (paste) but may be a liquid or a fluid containing a solid. The present invention may encompasses a case where a liquid or a fluid is cooled to solidify, or the like.

The correcting portion 100 is not limited to those which sandwich the film Fin the front-back direction to correct the filled shape. The correcting portion 100 may correct the filled shape by sandwiching the film F in the left-right direction. That is, the filled shape may be corrected by pressing the top gusset G3 and the bottom gusset G4. Moreover, the correcting portion 100 may correct the filled shape by sandwiching the film F in the front-back direction and the left-right directions.

The correcting portion 100 is not limited to those which includes a plate-shaped correcting body. The shape of the correcting body can varies as appropriate in accordance with the shape of the film packaging bag G with contents when shipped.

REFERENCE NUMERALS

1 Vertical bag-making/filling/packaging machine
10 Film supply portion
20 Top folding unit (top folding portion)
26 Auxiliary top seal portion
30 Bottom holding unit (bottom folding portion)
40 Top seal portion
50 Bottom seal portion
60 Design cutter portion
70 Film conveying portion
80 Filling portion
90 Squeezing roller portion
100 Correcting portion
102 First pair of correcting plates
103 Plate member (one of the first pair of correcting plates)
104 Plate member (the other of the first pair of correcting plates)
106 Second pair of correcting plates
107 Extension piece
108 Pressing piece
110 Side seal portion
120 Cutter portion
130 Plug mounting portion
F Film
F1 Fold for top gusset (first fold)
F3 Mountain fold
F5 Fold for Bottom gusset (second fold)
E1, E2 Side edge
G, H, J Film packaging bag
G3, H3 Top gusset
G31, H31 First pleat
G32 Second pleat
G4 Bottom gusset
G41 First pleat
G42 Second pleat
G5 Accommodating portion
G7 Spout portion
J8 Plug
T Top seal
T1, T2, T3 Seal
T2*a* Cut-off piece
T2*b* Inclined portion
T2*c* Notch
B Bottom seal
B1, B3 Seal
S Side seal
X Content

The invention claimed is:

1. A vertical bag-making/filling/packaging machine, comprising:
- a top folding portion which forms a first fold by folding a side of a band-shaped film into a Z-shape;
- a bottom folding portion which forms a second fold by folding a center of the film into an M-shape;
- a top seal portion which forms a top gusset and a spout portion protruding from the top gusset by heat-welding the first fold and side edges of the film so as to make the film into a tube shape;
- a bottom-seal portion which forms a bottom gusset by heat-welding the second fold;
- a conveying portion which conveys the film downstream from the bottom-seal portion;
- a filling portion which continuously distributes a content into the inside of the film;
- a correcting portion which corrects a filled shape of the film by sandwiching the film in a front-back direction;
- a squeezing roller portion which is disposed upstream to the correcting portion and squeezes the film by pressing the film in the front-back direction;
- a side-seal portion which is disposed downstream from the correcting portion and forms a bag body by heat-welding the film in a lateral direction; and
- a cutter portion which cuts off the bag body from the film;

wherein the correcting portion comprises:
- a first pair of correcting plates in close contact with a portion extending from the bottom gusset to the top gusset; and
- a second pair of correcting plates in close contact with a portion extending from the top gusset to the spout portion.

2. The vertical bag-making/filling/packaging machine according to claim 1, wherein the second pair of correcting plates comprises:
- an extension piece extending in the lateral direction from one of the first pair of correcting plates; and
- a pressing piece protruding from the other of the first pair of correcting plates and facing the extension piece.

3. The vertical bag-making/filling/packaging machine according to claim 1, wherein the first pair of correcting plates has a half-cylindrical shape, respectively.

4. The vertical bag-making/filling/packaging machine according to claim 1, wherein the top folding portion comprises an auxiliary top seal portion which heat-welds a mountain fold of the first fold to form a seal over a longitudinal direction of the first fold.

5. The film packaging bag with contents according to claim 4, wherein the seal has an arc shape with a center in the longitudinal direction.

6. The vertical bag-making/filling/packaging machine according to claim 1, comprising a design cutter portion which trims an outer shape of the spout portion, and
- the spout portion has a cut-off piece, which would be cut off when opened.

7. The vertical bag-making/filling/packaging machine according to claim 1, wherein the spout portion has a plug made of plastic, which is heat-welded between the side edges of the film.

8. A vertical bag-making/filling/packaging machine, comprising:
- a top folding portion which forms a first fold by folding a side of a band-shaped film into a Z-shape;
- a bottom folding portion which forms a second fold by folding a center of the film into an M-shape;
- a top seal portion which forms a top gusset and a spout portion protruding from the top gusset by heat-welding the first fold and side edges of the film so as to make the film into a tube shape; and
- a bottom-seal portion which forms a bottom gusset by heat-welding the second fold,
- wherein the top folding portion comprises an auxiliary top seal portion which heat-welds a mountain fold of the first fold to form a seal over a longitudinal direction of the first fold, and the seal is formed to have an arc shape with a center in the longitudinal direction.

9. The vertical bag-making/filling/packaging machine according to claim 8, wherein the top gusset includes a first pleat and a second pleat, the spout portion being disposed on the second pleat, and the second pleat having a fold width larger than that of the first pleat.

10. A method of manufacturing a film packaging bag with contents, comprising:
- a top folding step in which a first fold is formed by folding a side of a band-shaped film into a Z-shape;
- a bottom folding step in which a second fold is formed by folding a center of the film into an M-shape;
- a top seal step in which a top gusset and a spout portion protruding from the top gusset are formed by heat-welding the first fold and side edges of the film so as to make the film into a tube shape;
- a bottom seal step in which a bottom gusset is formed by heat-welding the second fold;
- a conveying step for conveying the film downstream from the bottom-seal portion;
- a filling step for continuously distributing a content into an inside of the film;
- a correcting step for correcting a filled shape of the film by sandwiching the film by the correcting portion in a front-back direction;
- a squeezing step for pressing and squeezing the film in the front-back direction with a squeezing roller portion disposed upstream to the correcting portion;
- a side seal step for forming a bag body by heat-welding the film in a lateral direction with the side-seal portion disposed downstream from the correcting portion; and
- a cutting-off step for cutting off the bag body from the film by a cutter portion,
- wherein, in the correcting step, a first pair of correcting plates is brought into close contact with a portion extending from the bottom gusset to the top gusset, and at the same time, a second pair of correcting plates is brought into close contact with a portion extending from the top gusset to the spout portion.

11. The method of manufacturing the film packaging bag with contents according to claim 10, wherein the top folding step comprises an auxiliary top seal step for forming a seal over a longitudinal direction of a mountain fold of the first fold.

12. The method of manufacturing the film packaging bag with contents according to claim 11, wherein the seal has an arc shape with a center in the longitudinal direction.

13. A method of manufacturing a film packaging bag with contents, comprising:
- a top folding step in which a first fold is formed by folding a side of a band-shaped film into a Z-shape;
- a bottom folding step in which a second fold is formed by folding a center of the film into an M-shape; and
- a top seal step in which a top gusset and a spout portion protruding from the top gusset are formed by heat-welding the first fold and side edges of the film so as to make the film into a tube shape,
- wherein the top folding step comprises an auxiliary top seal step in which a seal is formed over the longitudinal direction of a mountain fold of the first fold, and the seal is formed to have an arc shape with a center in the longitudinal direction.

14. The method of manufacturing the film packaging bag with contents according to claim 13, wherein top gusset includes a first pleat and a second pleat, the spout portion being disposed on the second pleat, and the second pleat having a fold width larger than that of the first pleat.

15. A film packaging bag with contents made by filling and enclosing a fluid in the film packaging bag, comprising:
- a top gusset in which films on a top surface of the film packaging bag overlap in an M-shape;
- a bottom gusset in which films on a bottom surface of the film packaging bag overlap in the M-shape; and
- a spout portion disposed on a top on one of two pleats of the top gusset,
- wherein, the two pleats include a first pleat and a second pleat, the spout portion being disposed on the second pleat,
- the first pleat has a seal which is formed by heat-welding the top of the first pleat over a longitudinal direction, and
- the seal has an arc shape with a center in the longitudinal direction.

16. The film packaging bag with contents according to claim 15, wherein the second pleat has a fold width larger than that of the first pleat.

17. The film packaging bag with contents according to claim 15, wherein both ends in the longitudinal direction of the two pleats are fixed to each other by heat-welding.

18. The film packaging bag with contents according to claim 15, wherein
- the spout portion has a cut-off piece formed by heat-welding side edges of the film, and
- the cut-off piece is cut off for forming an opening through which the fluid is taken out.

19. The film packaging bag with contents according to claim 15, wherein the spout portion is a plug made of plastic, and the plug is disposed and fixed between side edges of the film.

* * * * *